(12) United States Patent  
Sutardja (10) Patent No.: US 7,761,668 B2
(45) Date of Patent: *Jul. 20, 2010

(54) PROCESSOR ARCHITECTURE HAVING MULTI-PORTED MEMORY

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 12/574,110

(22) Filed: Oct. 6, 2009

(65) Prior Publication Data

US 2010/0023705 A1 Jan. 28, 2010

Related U.S. Application Data

(63) Continuation of application No. 11/504,962, filed on Aug. 16, 2006, now Pat. No. 7,600,081.

(60) Provisional application No. 60/822,320, filed on Aug. 14, 2006, provisional application No. 60/820,871, filed on Jul. 31, 2006, provisional application No. 60/798,569, filed on May 8, 2006, provisional application No. 60/759,868, filed on Jan. 18, 2006.

(51) Int. Cl.
*G06F 12/00* (2006.01)
*G06F 15/167* (2006.01)

(52) U.S. Cl. .............................. 711/149; 711/1; 709/213

(58) Field of Classification Search ...................... 711/1, 711/147, 149, 150; 709/213, 214, 216

See application file for complete search history.

(56) References Cited

U.S. PATENT DOCUMENTS 5,276,842 A 1/1994 Sugita

| | | |
|---|---|---|
| 5,361,370 A | 11/1994 | Sprague et al. |
| 5,459,851 A | 10/1995 | Nakajima et al. |
| 5,639,094 A * | 6/1997 | Manchester .................. 273/432 |
| 6,292,862 B1 * | 9/2001 | Barrenscheen et al. ...... 710/306 |
| 6,799,252 B1 | 9/2004 | Bauman |
| 6,816,889 B1 | 11/2004 | Graham |

(Continued)

OTHER PUBLICATIONS

Communication and Search Report from the European Patent Office dated May 16, 2007 for Application No. 06 024 608.9-2211; 11 pages.

(Continued)

*Primary Examiner*—Jack A Lane (57) ABSTRACT

A data processing system includes a multiport memory module including a plurality of first ports and a plurality of second ports. The data processing system includes a plurality of first buses and a plurality of second buses. A plurality of hardware acceleration modules configured to communicate with respective ones of the plurality of first ports via respective ones of the plurality of first buses. The data processing system includes a processor module. A random access memory (RAM) module configured to store data. The processor module and the RAM module communicate with the multiport memory module via respective ones of the plurality of second buses. A shared bus includes a first bus portion configured to communicate with the plurality of hardware acceleration modules at a first rate. A second bus portion configured to communicate with the processor module and the RAM module at a second rate that is different than the first rate. A bus bridge that communicates with the first bus portion and the second bus portion.

13 Claims, 9 Drawing Sheets

U.S. PATENT DOCUMENTS

| | | |
|---|---|---|
| 7,236,525 B2 | 6/2007 | Pearson |
| 2002/0165896 A1 | 11/2002 | Kim |
| 2003/0033490 A1 | 2/2003 | Gappisch et al. |
| 2004/0205305 A1 | 10/2004 | Lee et al. |
| 2004/0233994 A1 | 11/2004 | Pearson |
| 2005/0094729 A1 | 5/2005 | Yuan et al. |
| 2005/0108482 A1* | 5/2005 | Fuks .......................... 711/150 |

OTHER PUBLICATIONS

Asgari, Nasser; "Multiport Memory as a Medium for Interprocessor Communication in Multiprocessors"; Feb. 2003; Cover page, pp. 36-48 and pp. 192-203.

Hirano, K. et al; "A New Multiport Memory for High Performance Parallel Processor System with Shared Memory"; 1998; pp. 333-334.

MP0300; U.S. Appl. No. 10/702,744; "Multiport Memory Architecture, Device and Systems Including The Same, and Methods of Using the Same"; Winston Lee et al. 62 Pages.

MP0876PR; "Multicore Memory Management System"; Yung et al.; 16 Pages.

Martin, G. et al; "Winning the SoC Revolution"; Chapters 4-5; 2003; Springer; USA, XP002507072 ISBN: 1-4020-7495-6; 27 pages.

Official Communication from the European Patent Office dated Dec. 12, 2008 for Application No. 06 024 608.9-2211; 6 pages.

* cited by examiner

PROCESSOR ARCHITECTURE HAVING MULTI-PORTED MEMORY

CROSS-REFERENCE TO RELATED APPLICATIONS

This application is a continuation of U.S. application Ser. No. 11/504,962, filed Aug. 16, 2006, which claims the benefit of U.S. Provisional Application No. 60/822,320, filed Aug. 14, 2006, U.S. Provisional Application No. 60/820,871, filed Jul. 31, 2006, U.S. Provisional Application No. 60/798,569, filed May 8, 2006, and U.S. Provisional Application No. 60/759,868, filed Jan. 18, 2006, and is related to U.S. Provisional Application No. 60/752,522, filed Dec. 20, 2005. The disclosures of the above applications are incorporated herein by reference in their entirety.

FIELD

The present disclosure relates to data processing architectures, and more particularly to a multi-ported data memory architecture for processing.

BACKGROUND

Typically, data processing may be performed by splitting tasks between software and hardware. For example, certain tasks are complex but not necessarily computationally intensive and therefore performing the tasks with software is sufficient. Other tasks are more computationally intensive and therefore performing the tasks with hardware is more efficient. Parallel processing may be used to speed up the processing of computationally intensive tasks. Parallel processing may be used in video processing, gaming, complex mathematic modeling, video conferencing and/or other applications.

Various central processing units (CPUs) and hardware acceleration modules are typically connected together through an on-chip bus. Data transfer between the CPUs and/or the hardware acceleration modules requires relatively high bandwidth. Increasing the number of buses or the bandwidth of the on-chip bus increases the bandwidth available for data transfer. However, this approach is typically not cost-effective. For example, multi-channel video processors that are capable of processing multiple video streams have high bandwidth requirements.

Figure 1:
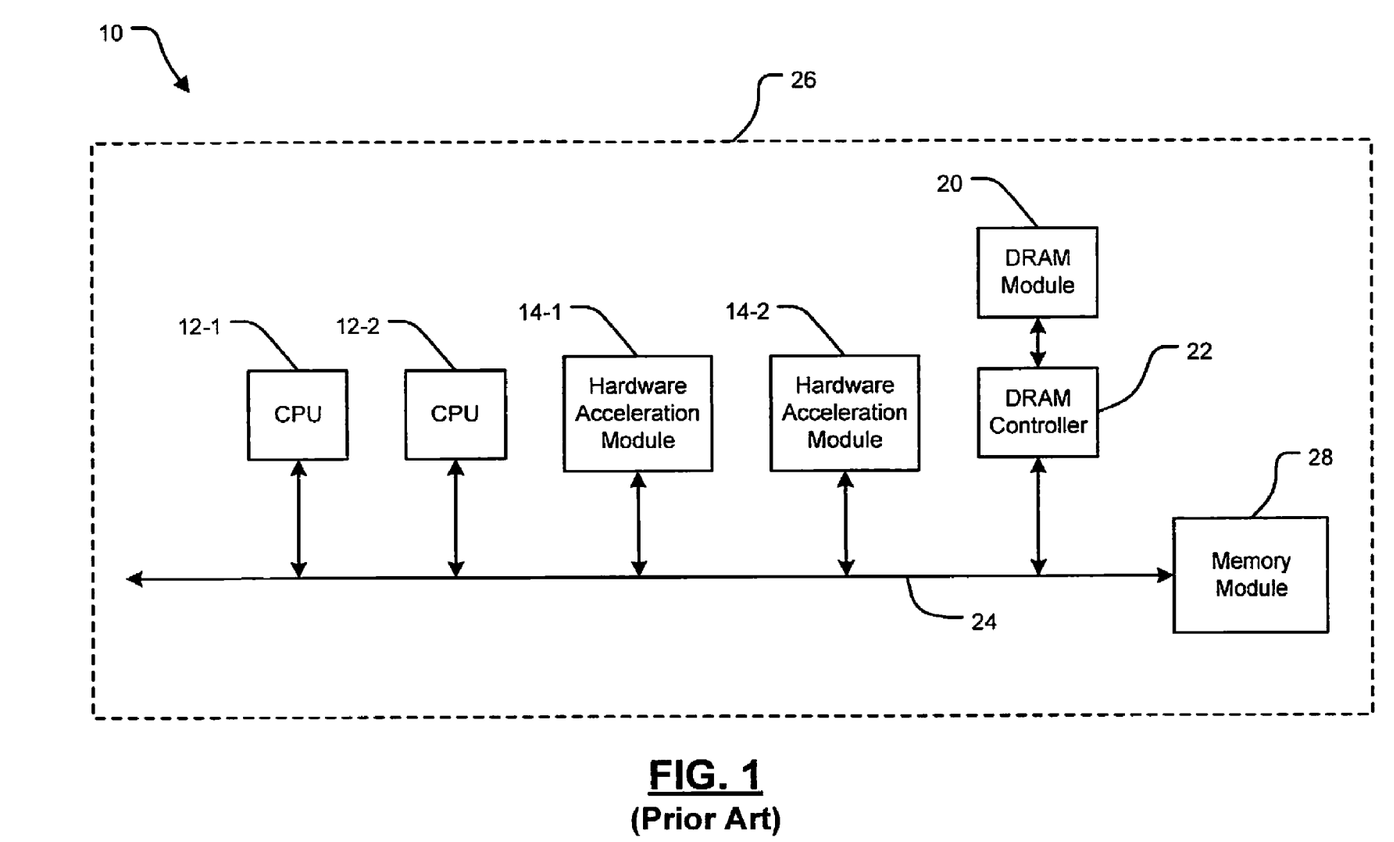
FIG. 1 is a functional block diagram of a data processing system according to the prior art.

Referring now to FIG. 1, a data processing system architecture 10 is shown. The data processing system 10 includes processor modules such as CPUs 12-1 and 12-2, referred to collectively as CPUs 12, and hardware acceleration modules (i.e. hardware processing modules) 14-1 and 14-2, referred to collectively as hardware acceleration modules 14. The CPUs 12, the hardware acceleration modules 14, a dynamic random access memory (DRAM) module 20, and a DRAM controller 22 communicate over a communication bus 24. The CPUs 12, hardware acceleration modules 14, communication bus 24, DRAM module 20, and/or a DRAM controller 22 may be included on a printed circuit board (PCB) or integrated by a system on a chip (SOC) 26. The CPUs 12, the hardware acceleration modules 14, and the DRAM controller 22 communicate with a memory module 28 via the communication bus 24. The processing performance of the processing system 10 is limited by the capabilities of the communication bus 24. In other words, processing speed is limited by the speed and/or bandwidth of the communication bus 24.

SUMMARY

A data processing system comprises a multiport memory module having N ports and N data communication buses. N hardware acceleration modules communicate with a respective one of the N ports on a respective one of the N data communication buses. A first one of the N hardware acceleration modules performs a first processing task on data and transmits the data to the multiport memory module on a first one of the N data communication buses. A second one of the N hardware acceleration modules receives the data from the multiport memory module on a second one of the N data communication buses and performs a second processing task on the data. N is an integer greater than one.

In other features of the invention, the data includes at least one of video data and control data. The multiport memory module may include multi-bank memory with interleaving. The multiport memory module may include a multiport data tightly-coupled memory (MP-DTCM) module. The multiport memory module includes J additional ports and J additional data communication buses. J-A processor modules and J-B dynamic random access memory (DRAM) modules communicate with the multiport memory module on respective ones of the J data communication buses. J is an integer greater than one, A and B are integers greater than or equal to one, and A+B=J. At least one of the first and second ones of the N data communication buses has a first data width and the J data communication buses have a second data width. The first data width has fewer bits than the second data width. The first data width is at least one of 8 bits and 16 bits and the second data width is at least one of 32 bits, 64 bits, and 128 bits.

In still other features of the invention, the data processing system further comprises at least one programmable sideband processor module. The at least one programmable sideband processor module comprises an instruction tightly-coupled memory (ITCM) module, a processor core, and a data tightly-coupled memory (DTCM) module. The DTCM module communicates with the multiport memory module and a direct memory access (DMA) module controls data transfers between the DTCM module and the memory module. The DTCM module is at least one of dual-ported and multi-banked. The data processing system further comprises a shared bus. The shared bus comprises a first bus portion and a second bus portion. A bus bridge communicates with the first bus portion and the second bus portion. The N hardware acceleration modules communicate on the first bus portion at a first rate and the J-A processor modules and the J-B DRAM modules communicate on the second bus portion at a second rate.

In still other features of the invention, the programmable sideband processor module processes at least one of 8 bit data and multiples of 16 bit data. The programmable sideband processor module includes a single instruction, multiple data (SIMD) processor. A high definition television (HDTV) comprises the data processing system.

A data processing system comprises a multiport memory module having N+M ports and N+M data communication buses. N hardware acceleration modules communicate with a respective one of the N ports on a respective one of the N data communication buses. M programmable sideband processor modules communicate with a respective one of the M ports on a respective one of the M data communication buses. One of the N hardware acceleration modules performs a first processing task on data and transmits the data to the multiport memory module on one of the N data communication buses and one of the M programmable sideband processor modules receives the data from the multiport memory module on one of the M data communication buses and performs a second processing task on the data. N and M are integers greater than or equal to one.

In other features of the invention, the multiport memory module includes J additional ports. A shared bus includes a first bus portion that communicates with N hardware acceleration modules and the M programmable sideband processor modules at a first rate, a second bus portion communicates with J-A processor modules and J-B RAM modules at a second rate, and a bus bridge communicates with the first bus portion and the second bus portion. J is an integer greater than one, A and B are integers greater than or equal to one, and A+B=J.

A data processing system comprises multiport memory means for storing data and having N ports, N data communication bus means for transmitting data, and N hardware acceleration means for communicating with a respective one of the N ports on a respective one of the N data communication buses. A first one of the N hardware acceleration means performs a first processing task on data and transmits the data to the multiport memory means on a first one of the N data communication bus means and a second one of the N hardware acceleration means receives the data from the multiport memory means on a second one of the N data communication bus means and performs a second processing task on the data. N is an integer greater than one.

In other features of the invention, the data includes at least one of video data and control data. The multiport memory means includes a multiport data tightly-coupled memory (MP-DTCM) module. The multiport memory means includes J additional ports and J additional data communication buses. The data processing system comprises J-A processor means and J-B dynamic random access memory (DRAM) means for communicating with the multiport memory means on respective ones of the J data communication bus means. J is an integer greater than one, A and B are integers greater than or equal to one, and A+B=J. At least one of the first and second ones of the N data communication bus means has a first data width and the J data communication bus means have a second data width. The first data width has fewer bits than the second data width. The first data width is at least one of 8 bits and 16 bits and the second data width is at least one of 32 bits, 64 bits, and 128 bits.

In still other features of the invention, the data processing system further comprises at least one programmable sideband processor means for performing a hardware acceleration function. At least one of the programmable sideband processor means includes an instruction tightly-coupled memory (ITCM) module, a processor core, and a data tightly-coupled memory (DTCM) module. The DTCM module communicates with the multiport memory means and a direct memory access (DMA) module controls data transfers between the DTCM module and the multiport memory means. The DTCM module is at least one of dual-ported and multi-banked. The data processing system further comprises a shared bus. The shared bus comprises first bus portion means for communicating with the N hardware acceleration means at a first rate, second shared bus means for communicating with at least one of the processor means and the DRAM means at a second rate, and bus bridge means for communicating with the first bus portion means and the second bus portion means.

In still other features of the invention, the programmable sideband processor means processes at least one of 8 bit data and multiples of 16 bit data. The programmable sideband processor means includes a single instruction, multiple data (SIMD) processor. A high definition television (HDTV) comprises the data processing system.

A data processing method comprises performing a first processing task on data at a first one of N hardware acceleration modules, transmitting the data to a respective first one of N ports of a multiport memory module on a respective first one of N data communication buses, receiving the data from a respective second one of the N ports of the multiport memory module at a second one of the N hardware acceleration modules on a respective second one of the N data communication buses, and performing a second processing task on the data at the second one of the N hardware acceleration modules. N is an integer greater than one.

In other features of the invention, the data includes at least one of video data and control data. The multiport memory module includes a multiport data tightly-coupled memory (MP-DTCM) module. The data processing method further comprises communicating with at least one of J-A processor modules and J-B dynamic random access memory (DRAM) modules with the multiport memory module on respective ones of J additional data communication buses. N is an integer greater than one, A and B are integers greater than or equal to one, and A+B=J. At least one of the first and second ones of the N data communication buses has a first data width and the J additional data communication buses has a second data width. The first data width has fewer bits than the second data width. The first data width is at least one of 8 bits and 16 bits and the second data width is at least one of 32 bits, 64 bits, and 128 bits.

In still other features of the invention, the data processing method further comprises performing a hardware acceleration function with a programmable sideband processor module. The programmable sideband processor module comprises an instruction tightly-coupled memory (ITCM) module, a processor core, and a data tightly-coupled memory (DTCM) module. The DTCM module communicates with the multiport memory module and a direct memory access (DMA) module controls data transfers between the DTCM module and the multiport memory module. The DTCM module is at least one of dual-ported and multi-banked. The data processing method further comprises communicating on a first bus portion of a shared bus at a first rate with the N hardware acceleration modules, communicating on a second bus portion of the shared bus at a second rate with the J-A processor modules and the J-B DRAM modules, and communicating with the first bus portion and the second bus portion with a bus bridge. The programmable sideband processor module processes at least one of 8 bit data and multiples of 16 bit data. The programmable sideband processor module includes a single instruction, multiple data (SIMD) processor.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

According to the present invention, a processing system includes a multiported data memory architecture. An exemplary multiport memory architecture is described in "Multiport Memory Architecture, Devices and Systems Including the Same, and Methods of Using the Same," U.S. patent application Ser. No. 10/702,744, filed on Nov. 5, 2003, which is hereby incorporated by reference, in its entirety.

Figure 2:
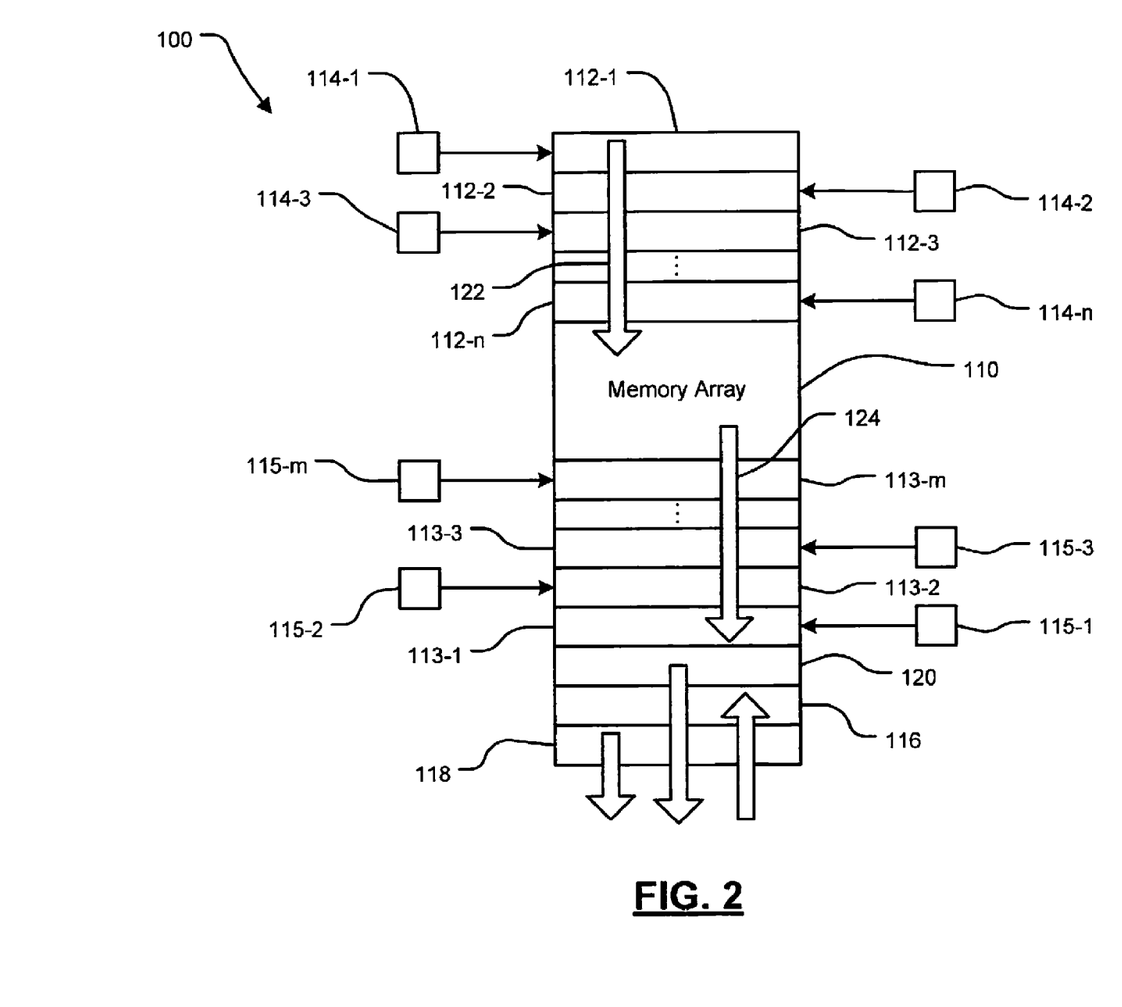
FIG. 2 is a functional block diagram of a multiport memory module according to the present invention.

Referring now to FIG. 2, a multiport memory module 100 (i.e. a memory module that is arranged according to multiport memory architecture) includes a memory array 110, write port buffers 112-1, 112-2, 112-3 . . . , and 112-n (referred to collectively as write port buffers 112), read port buffers 113-1, 113-2, 113-3, . . . , and 113-m (referred to collectively as read port buffers 113), write ports 114-1, 114-2, 114-3, . . . , and 114-n (referred to collectively as write ports 114), read ports 115-1, 115-2, 115-3, . . . , and 115-m (referred to collectively as read ports 115), parallel read and write registers 116 and 118, respectively, and a "snoop" register 120.

The port buffers 112 include one or more registers or banks of flip-flops, latches, registers, and/or any other device or module suitable for transmitting and receiving data between the ports 114 and the memory array 110. The port buffers 112 and the memory array 110 communicate via buses (e.g. a common memory write a bus 122 and a common memory read bus 124). Although the multiport memory module 100 is shown having a single port memory structure, those skilled in the art can appreciate that a dual port memory structure may be used.

The memory array 110 may include a plurality of memory sub-arrays (not shown). The sub-arrays may include one or more rows, columns, blocks, and/or pages of memory. Each of the memory rows, columns, blocks, and/or pages may be identifiable and/or accessible by a unique memory address corresponding to the row, column, block, and/or page. Each block of data transferred between the memory array 110 and one of the port buffers 112 includes a page of data. Typically, a minimum density of the memory array 110 is 256 kb or 1 Mb. While a maximum density of the memory array 110 is not limited, a typical maximum density is 32 Mb, 64 Mb, or 128 Mb. The memory array 110 may include latches, static random access memory (SRAM), dynamic random access memory (DRAM), magnetic random access memory (MRAM), electrically erasable and programmable read only memory (EEPROM), and flash memory. The memory array 110 may also be synchronous or asynchronous.

The port buffers 112 may be "tightly coupled" to the memory array 110. When memory architecture is tightly coupled, a plurality of processors are directly coupled to a memory module or are coupled to the memory module via a shared memory bus. The memory busses 122 and 124 are designed to reduce or minimize resistive-capacitive (RC) components, such as bus length (corresponding to resistance) and/or parasitic capacitance between adjacent metal lines in the bus. Consequently, bandwidth and memory access efficiency are increased. Communication between the port buffers 112 and memory array 110 is preferably not delayed by clocked circuit elements in a port buffer that is tightly coupled to a memory array.

The memory array 110 can include multi-bank dynamic random access memory (MDRAM) instead of and/or in addition to tightly coupled memory. Conventional memory designs typically use a single monolithic "block" of memory for a buffer. MDRAM breaks its memory up into multiple 32 KB banks that can be accessed independently. As a result, memory accesses can be interleaved between banks to allow memory accesses to overlap and provide greater performance.

Figure 3:
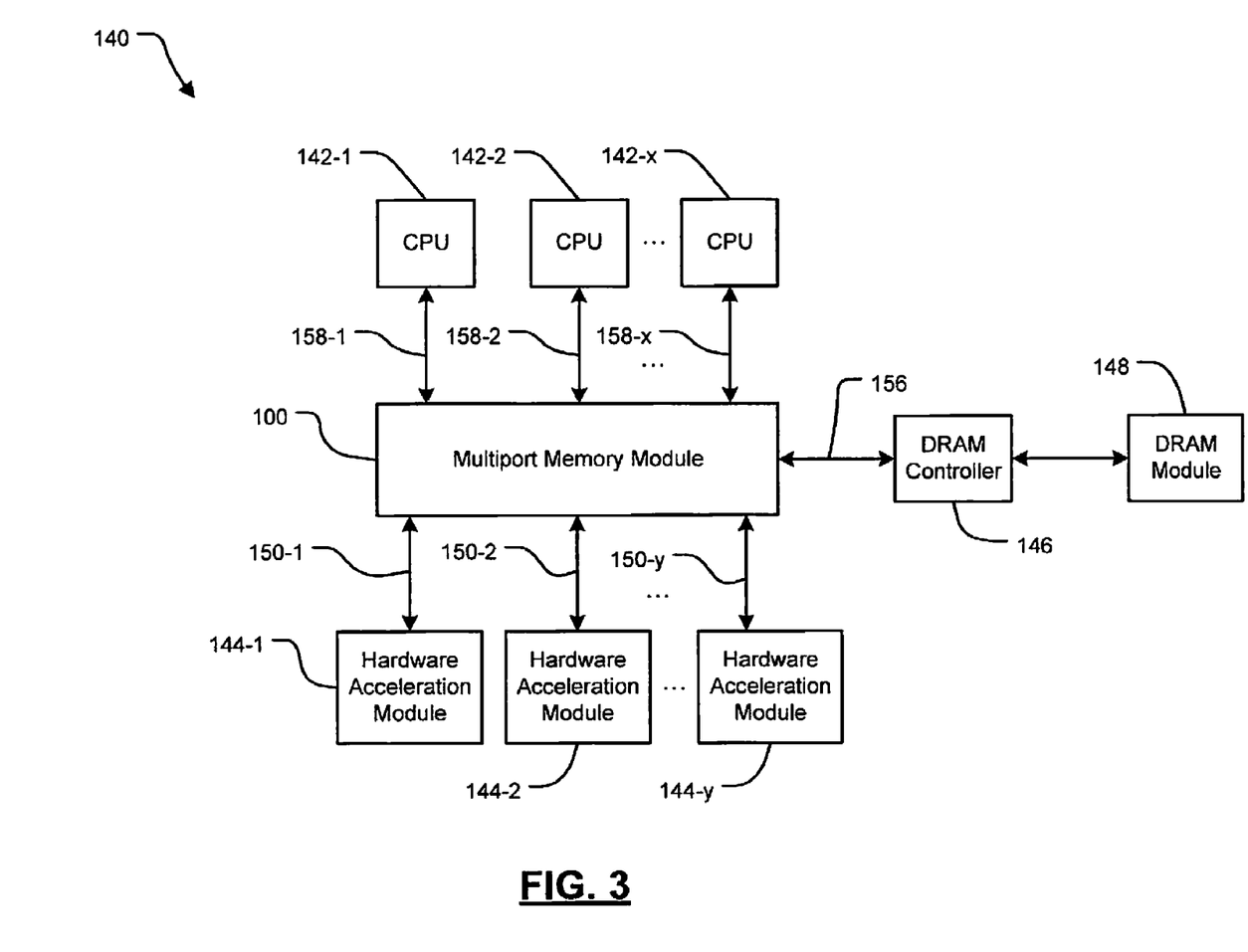
FIG. 3 is a functional block diagram of a multiport memory system that includes a multiport memory module according to the present invention.

Referring now to FIG. 3, a multiport memory system 140 includes the multiport memory module 100. The multiport memory system 140 includes processor modules (CPUs) 142-1, 142-2, . . . , and 142-x (referred to collectively as CPUs 142), hardware acceleration modules 144-1, 144-2, . . . , and 144-y (referred to collectively as hardware acceleration modules 144), a DRAM controller 146, and a DRAM module 148. For example, the CPUs 142 are processors that execute general software and firmware instructions. The hardware acceleration modules 144 each communicate with the multiport memory module 100 via individual (i.e. dedicated) buses 150-1, 150-2, . . . , and 150-y (referred to collectively as buses 150). More specifically, the hardware acceleration modules 144 each communicate with the multiport memory module 100 via dedicated buses instead of sharing a common bus as described above in FIG. 1. The CPUs 142 and DRAM controller 146 may share a single bus or communicate on individual buses 156 and 158-1, 158-2, . . . , and 158-x (referred to collectively as buses 158) as shown.

Figure 4:
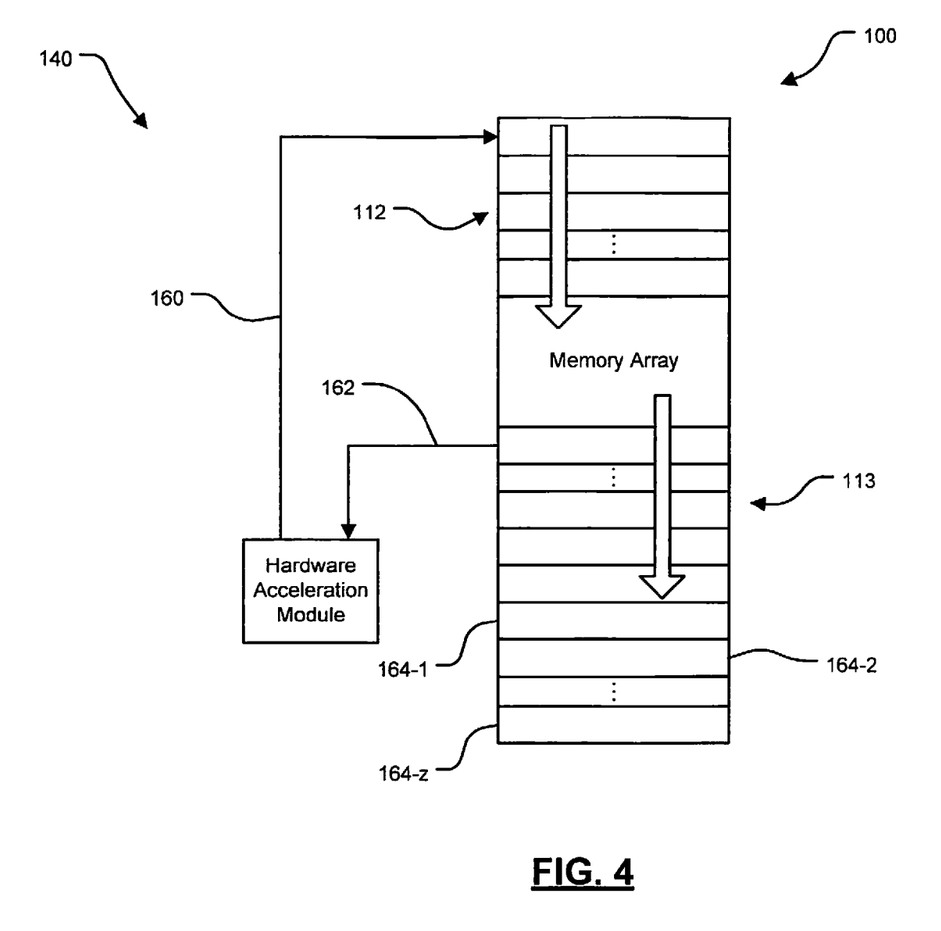
FIG. 4 is a functional block diagram of a multiport memory system that communicates with a hardware acceleration module according to the present invention.

Referring now to FIG. 4, each of the hardware acceleration modules 144 communicates, individually, with the multiport memory module 100 via buses 160 and 162. Typically, hardware acceleration buses have a data width of 32 bits. Here, the buses 160 and 162 may be narrower to minimize wiring congestion and to reduce die size. For example, the buses 160 and 162 may have a data width of 8 or 16 bits. The bus 160 is a write bus that communicates with the write port buffers 112 (via the write ports 114 as shown in FIG. 2) of the multiport memory module 100. Conversely, the bus 162 is a read bus that communicates with the read port buffers 113 (via the read ports 115 as shown in FIG. 2). The multiport memory module 100 may include additional read port buffers 164-1, 164-2, . . . , and 164-z (referred to collectively as read port buffers 164) that communicate with the CPUs 142 and/or the DRAM controller 146. The read port buffers 164 have a bus width of 64 bits, 128 bits, or greater. In other words, the CPUs 142 and/or the DRAM controller 146 may communicate with the multiport memory module 100 via buses that maintain a larger data width than the hardware acceleration modules 144.

Referring now to FIGS. 3 and 4, each of the hardware acceleration modules 144 stores intermediate data in the multiport memory module 100 while performing data processing. A first one of the hardware acceleration modules 144 first transfers data to the multiport memory module 100 via the write port buffers 112 instead of transferring data directly to another hardware acceleration module 144. Subsequently, the data is transferred from the multiport memory module 100 to one of the other hardware acceleration modules 144 via the read port buffers 113. In this manner, each of the hardware acceleration modules is able to individually process data without arbitration and/or contention as is necessary in the conventional system shown in FIG. 1.

As a result of this architecture, the bandwidth of the multiport memory system 140 may be approximately doubled with respect to a shared bus architecture as described in FIG. 1. However, those skilled in the art can appreciate that further increasing the bandwidth of any of the individual buses of the hardware acceleration modules 144 (i.e. the buses 160 and 162) can be accomplished much easier than increasing the bandwidth of a shared on-chip bus. For example, the multiport memory module 100 may include multiple port buffers as described in FIG. 4, allowing the total bandwidth of the individual hardware acceleration modules 144 to be decoupled. In other words, because the shared bus architecture is eliminated, each of the hardware acceleration modules 144 requires significantly lower bandwidth resources. Instead, each of the hardware acceleration modules 144 communicates with relatively narrow, dedicated individual buses such as the buses 160 and 162. As a result of the point-to-point nature of the buses 160 and 162 (i.e. between each of the hardware acceleration modules 144 and the multiport memory module 100), a high density rating and high clock frequency operation are easily achieved.

For example, when the memory array of the multiport memory module 100 has a ×128 configuration (i.e. a data width that is a multiple of 128 bits), a bandwidth of 51.2 gigabits (Gbits) can be achieved by running the memory core at 400 MHz. Similarly, when each port (i.e. a read port and a write port) of the hardware acceleration modules 144 has a ×16 configuration (i.e. a data width that is a multiple of 16 bits), each port can achieve 3.2 Gbits of bandwidth using a 200 MHz clock. Typically, a 1920×1080 pixel high definition television (HDTV) requires approximately 1.5 Gbits/second of bandwidth for each data transfer in or out of a central memory. For example, the multiport memory system 140 as described in FIGS. 3 and 4 is capable of processing 2 streams of video data according to the 1.5 Gbits/second requirements using a 200 MHz clock between the hardware acceleration modules 144 and the multiport memory module 100. Using a 400 MHz clock, the multiport memory system 140 is capable of processing 4 streams of video data according to the 1.5 Gbits/second requirements.

Another advantage of the multiport memory system 140 is that the hardware acceleration modules 144 can be designed on an individual basis. For example, each individual hardware acceleration module 144 can be designed to optimize performance of the hardware acceleration module 144 without regard to bandwidth limitations of a shared on-chip bus. A hardware acceleration module 144 can be optimized for a specific function that potentially increases the overall bandwidth of the multiport memory system 140. In other words, the data processing capabilities of the system 140 are scalable.

Figure 5:
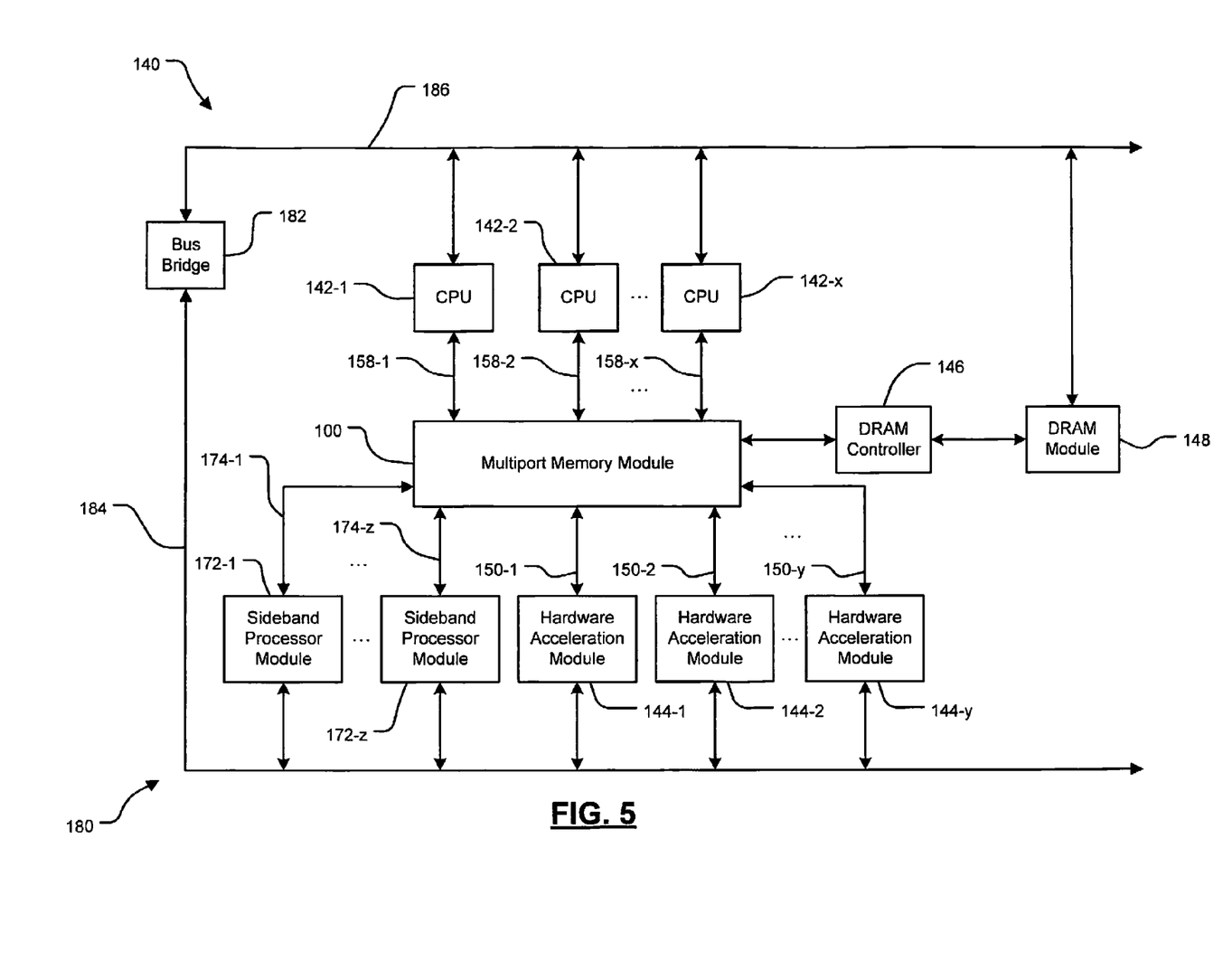
FIG. 5 is a functional block diagram of a multiport memory system including a programmable sideband processor module according to the present invention.

Referring now to FIG. 5, the number of hardware acceleration modules (and additional corresponding ports and buffers, not shown) may be increased to scale (i.e. increase) the data processing capabilities of the multiport memory system 140. For example, the system 140 may include processors (such as sideband processors) that primarily process data to and from the multiport memory module 100. The processors can be added to the multiport memory system 140 as required to achieve a desired level of data processing capabilities.

For example, the system 140 may include one or more programmable sideband processor modules 172-1, . . . , and 172-z (referred to collectively as programmable sideband processor modules 172). The programmable sideband processor modules 172 communicate with the multiport memory module 100 via individual buses 174-1, . . . , and 174-z (referred to collectively as buses 174). The buses 174 are analogous to the buses 160 and 162 as described in FIG. 4. For example, the buses 174 have a data width of 16 bits.

Generally, hardware acceleration modules are designed to be space-efficient and to perform fixed, specific functions. For example, hardware acceleration modules may be designed to process speed-critical applications. Any changes to a hardware acceleration module requires changing the integrated circuit (IC) that includes the hardware acceleration module. In contrast, each of the programmable sideband processor modules 172 may be programmed to change one or more functions of the programmable sideband processor modules 172 without changing the IC. For example, a user or manufacturer may program one of the programmable sideband processor modules 172 to comply with various operating standards and/or to process a different function.

As shown in FIG. 5, the programmable sideband processor modules 172 may be dedicated to process tasks that the hardware acceleration modules 144 would otherwise perform. In other words, each of the programmable sideband processor modules 172 are designed to perform one or more specific hardware acceleration functions and may have a smaller feature set than either the CPUs 142 or the hardware acceleration modules 144.

The multiport memory system 140 may include a shared bus 180. The CPUs 142, hardware acceleration modules 144, DRAM controller 146, and programmable sideband processor modules 172 communicate with each other via the shared bus 180. For example, the programmable sideband processor modules 172 may pass control messages on the shared bus 180 to avoid bus congestion. Similarly, the CPUs 142 may pass messages and control information on the shared bus 180. The shared bus 180 includes a bus bridge 182 that allows the CPUs 142 and DRAM controller 146 to transmit/receive data on the shared bus 180 at a first rate and allows the hardware acceleration modules 144 and the programmable sideband processor modules 172 to transmit/receive data on the shared bus 180 at a second rate. For example, the shared bus 180 may include a first portion 184 that operates at a low or medium rate and a second portion 186 that operates at a high rate.

Figure 6A:
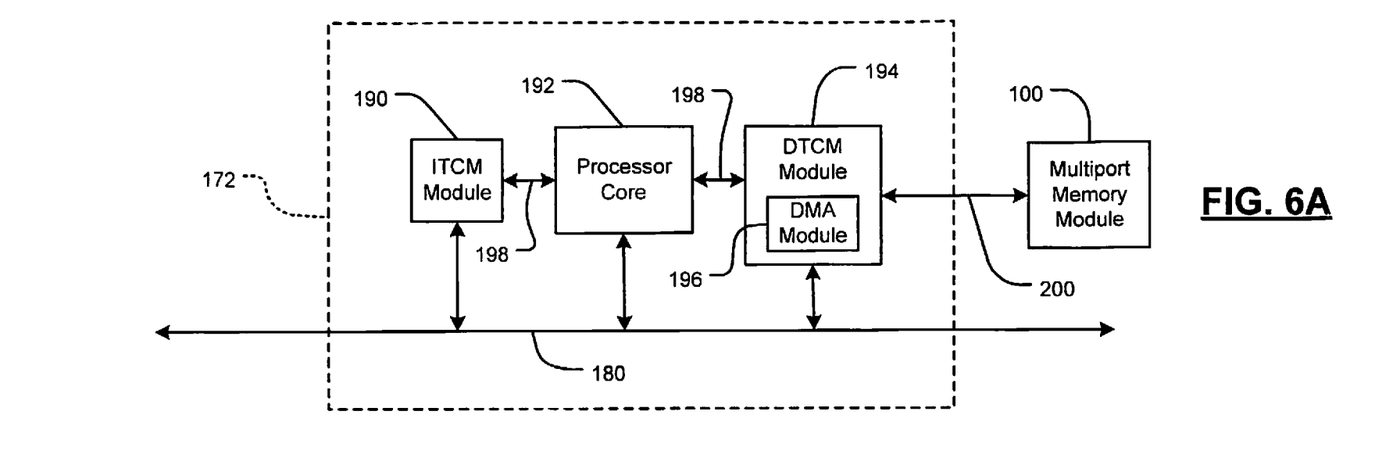
FIGS. 6A and 6B are functional block diagrams of programmable sideband processor modules according to the present invention.
Figure 6B:
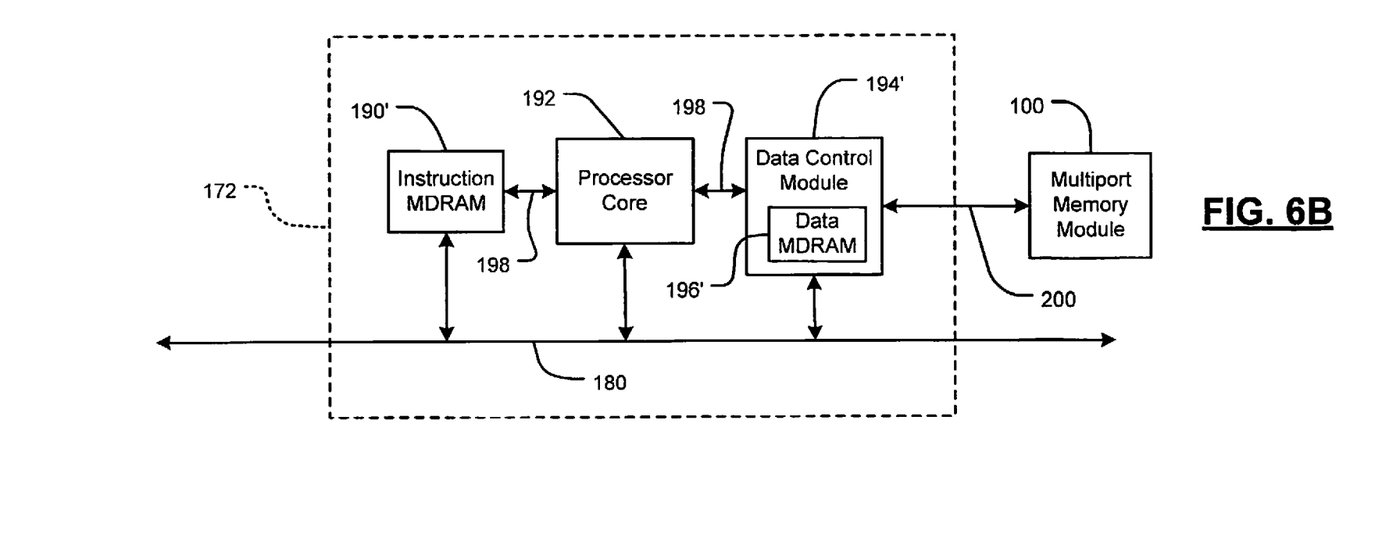

Referring now to FIGS. 6A and 6B, exemplary programmable sideband processors are shown in further detail. In FIG. 6A, each of the programmable sideband processor modules 172 includes an instruction tightly-coupled memory (ITCM) module 190, a processor core 192, and a data tightly-coupled memory (DTCM) module 194. A more detailed description of a tightly-coupled memory structure can be found in U.S. Provisional Application No. 60/752,522, filed on Dec. 20, 2005, which is incorporated herein by reference in its entirety. Alternately, instruction memory 190' and data memory 196' associated with data control module 194' can include MDRAM with interleaving.

The ITCM module 190 preferably includes sufficient memory to enable each of the programmable sideband processor modules 172 to perform corresponding tasks. In other words, programming a programmable sideband processor module 172 may include changing the instructions stored on the ITCM module 190. For example, one of the programmable sideband processor modules 172 may be programmed to emulate one of the hardware acceleration modules 144. In other words, the programmable sideband processor modules 172 allow flexibility in implementing the multiport memory system 140. The programmable sideband processor module 172 can be programmed with new functions (e.g. algorithms that perform specific processing tasks) by modifying instructions that reside on the programmable sideband processor module 172.

The programmable sideband processor module 172 includes a DMA module 196 that transfers data in and out of the DTCM module 194 independent of sideband processor activity. For example, the DTCM module 194 is at least one of dual-ported and multi-banked. As a result, the processor core 192 can access the DTCM module 194 concurrently with data transfers to and from the multiport memory module 100 without interrupting or hindering sideband processor activity.

At least two macro blocks of data such as video data may reside in the programmable sideband processor module 172 at any given time. For example, a first macro block of data is in the programmable sideband processor module 172 to be processed and a second macro block of data may be in the programmable sideband processor module 172 for subsequent transfer to or from the multiport memory module 100.

The ITCM module 190, processor core 192, and DTCM module 194 communicate on the shared bus 180 as described in FIG. 5, as well as an internal bus 198. The DTCM module 194 communicates with the multiport memory module 100 via a single bidirectional bus 200 or two unidirectional buses (not shown).

As shown in FIG. 6, the programmable sideband processor modules 172 may not include a cache memory to minimize die size and to maximize sideband processor data processing. For example, a programmable sideband processor module 172 operating at 1 GHz may allow approximately 16 cycles for each pixel operation for a 1920×1080 pixel HDTV. As such, the programmable sideband processor module 172 ideally maximizes the available cycles for code execution rather than for transferring data to and from the DTCM module 194 (as would be necessary if the programmable sideband processor module 172 included a cache memory). Although the present implementation omits cache memory, those skilled in the art can appreciate that programmable sideband processor modules 172 including cache memory are anticipated.

The programmable sideband processor modules 172 may be optimized to process multiples of 16 bit data and/or 8 bit data. For example, the programmable sideband processor modules 172 may implement a single instruction, multiple data (SIMD) processor that is configured to process multiples of 16 bit data and/or 8 bit data. Any complex 32 bit operations can be supported in software to reduce power consumption of the programmable sideband processor modules 172.

Figure 7:
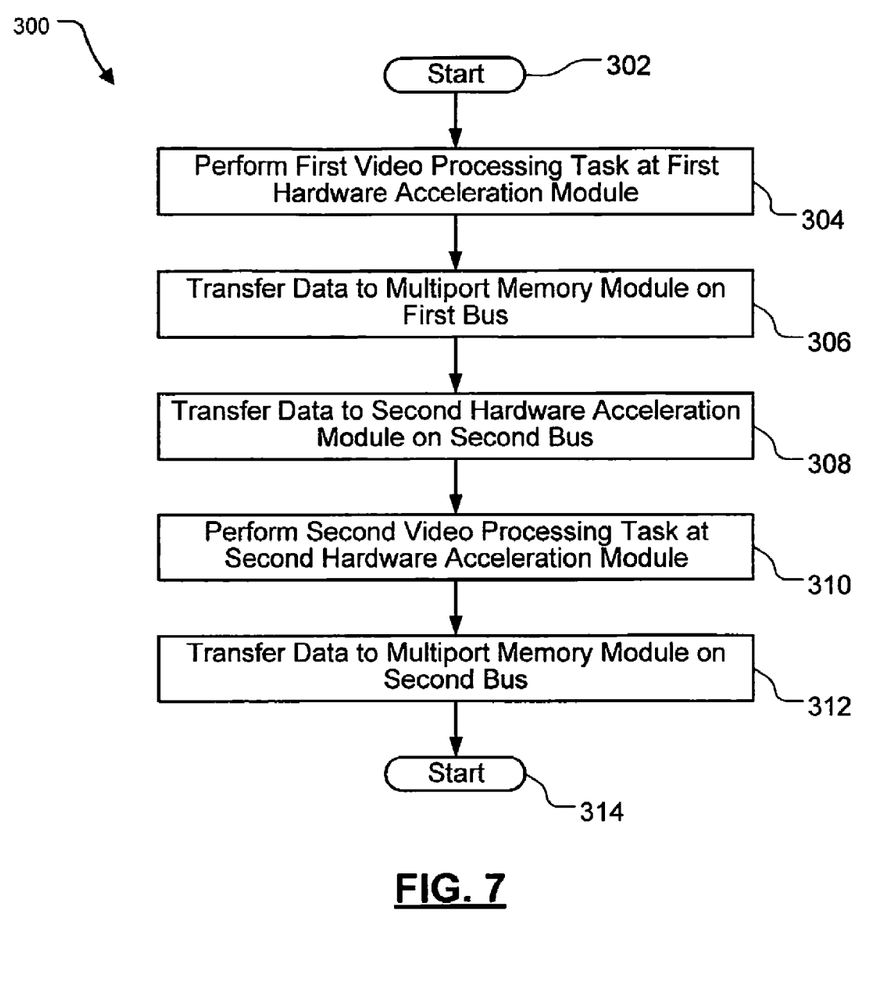
FIG. 7 is a flow diagram that illustrates steps of a data processing method according to the present invention.

Referring now to FIG. 7, a data processing method 300 according to the multiport memory architecture of the present invention begins in step 302. In step 304, a first hardware acceleration module performs a first processing task on data. In step 306, the first hardware acceleration module transfers the data to a multiport memory module on a first data bus. In step 308, the multiport memory module transfers the data to a second hardware acceleration module on a second data bus. In step 310, the second hardware acceleration module performs a second processing task on the data. In step 312, the second hardware acceleration module transfers the data to the multiport memory module on the second data bus. The method 300 terminates in step 314.

Figure 8A:
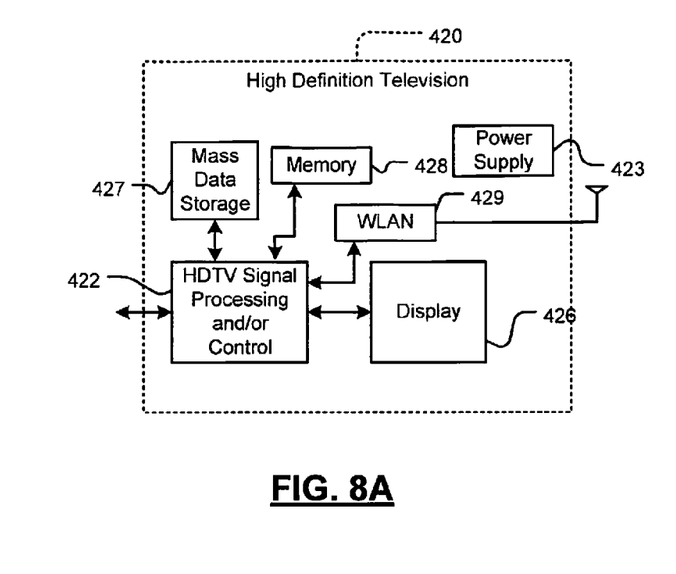
FIG. 8A is a functional block diagram of a high definition television.
Figure 8B:
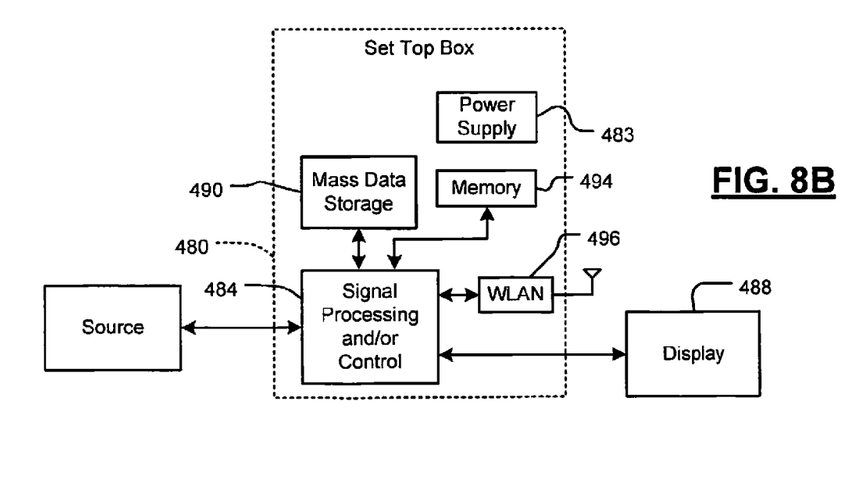
FIG. 8B is a functional block diagram of a set top box.
Figure 8C:
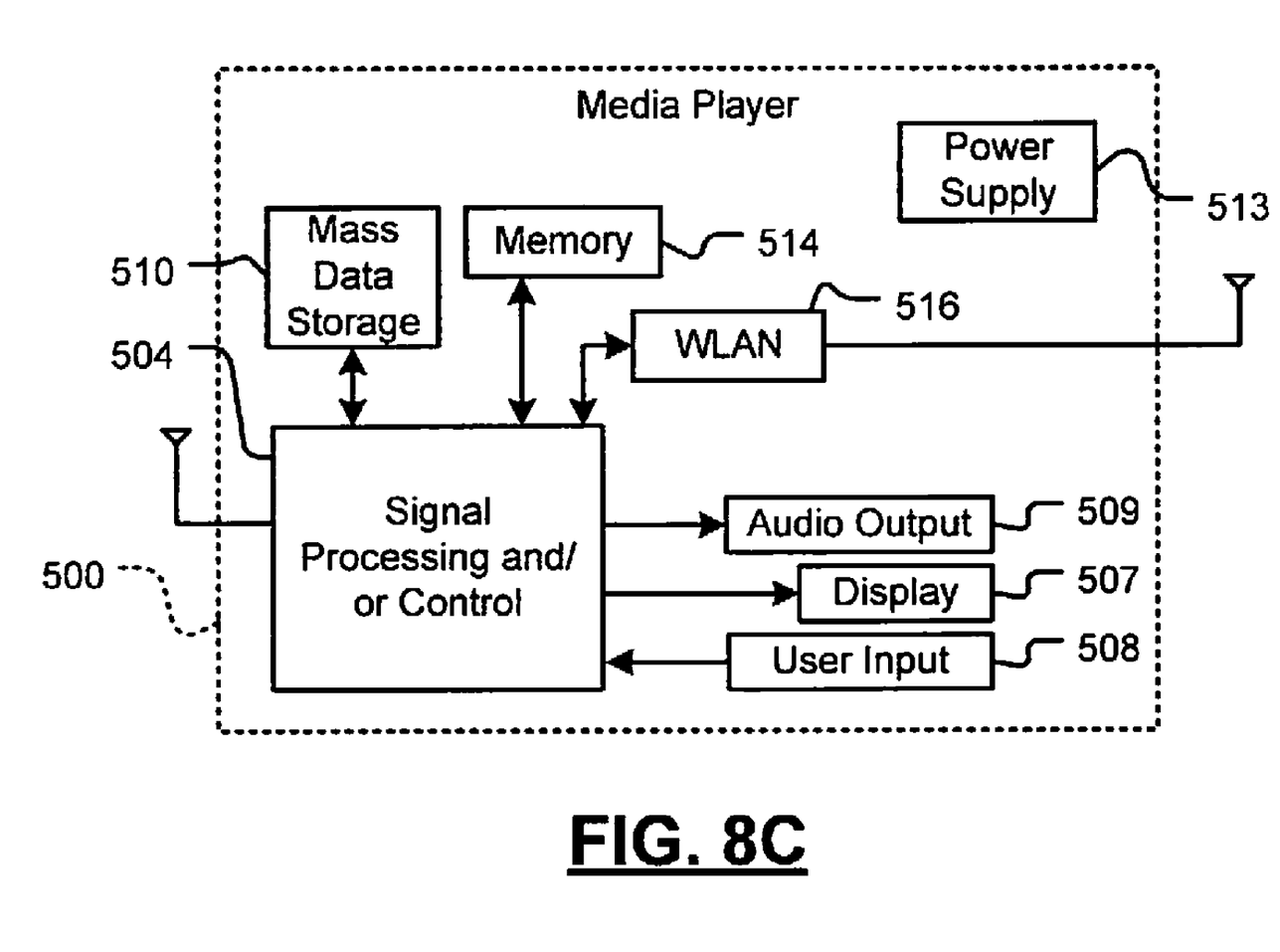
FIG. 8C is a functional block diagram of a media player.

Referring now to FIGS. 8A-8C, various exemplary implementations of the invention are shown. Referring now to FIG. 8A, the present invention can be implemented in an HDTV 420. The HDTV 420 includes signal processing and/or control circuits, which are generally identified in FIG. 8A at 422, a WLAN interface, mass data storage of the HDTV 420, and/or a power supply 423. The invention may implement and/or be implemented in either or both the signal processing and/or control circuits 422. The HDTV 420 receives HDTV input signals in either a wired or wireless format and generates HDTV output signals for a display 426. In some implementations, the signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 8B, the present invention can be implemented in a set top box 480. The set top box 480 includes signal processing and/or control circuits, which are generally identified in FIG. 8B at 484, a WLAN interface, mass data storage of the set top box 480 and/or a power supply 483. The invention may implement and/or be implemented in either or both signal processing and/or control circuits 484. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices such as hard disk drives (HDDs) and/or digital versatile discs (DVDs). The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Referring now to FIG. 8C, the present invention can be implemented in a media player 500 that includes video capabilities. The media player 500 includes signal processing and/or control circuits, which are generally identified in FIG. 8C at 504, a WLAN interface, mass data storage of the media player 500 and/or a power supply 503. The invention may implement and/or be implemented in either or both signal processing and/or control circuits 504. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A data processing system comprising:
a multiport memory module including a plurality of first ports and a plurality of second ports;
a plurality of first buses;
a plurality of second buses;
a plurality of hardware acceleration modules configured to communicate with respective ones of the plurality of first ports via respective ones of the plurality of first buses;
a processor module;
a random access memory (RAM) module configured to store data, wherein the processor module and the RAM module communicate with the multiport memory module via respective ones of the plurality of second buses; and
a shared bus comprising:
a first bus portion configured to communicate with the plurality of hardware acceleration modules at a first rate;
a second bus portion configured to communicate with the processor module and the RAM module at a second rate that is different than the first rate; and
a bus bridge that communicates with the first bus portion and the second bus portion.

2. The data processing system of claim 1, wherein:
a first one of the plurality of hardware acceleration modules is configured to perform a first processing task on data and to transmit the data to the multiport memory module via a first one of the plurality of first buses; and
a second one of the plurality of hardware acceleration modules is configured to receive the data from the multiport memory module via a second one of the plurality of first buses and to perform a second processing task on the data.

3. The data processing system of claim 2, wherein at least one of the first one and the second one of the first plurality of buses has a first data width and the plurality of second buses have a second data width.

4. The data processing system of claim 3, wherein the first data width has fewer bits than the second data width.

5. The data processing system of claim 1, wherein the plurality of hardware acceleration modules are configured to store intermediate data in the multiport memory module while performing processing tasks.

6. The data processing system of claim 1, wherein the stored data includes at least one of video data and control data.

7. The data processing system of claim 1, wherein the multiport memory module includes a multiport data tightly-coupled memory (MP-DTCM) module.

8. The data processing system of claim 1, further comprising a programmable sideband processor module configured to communicate with the multiport memory module via a third bus.

9. The data processing system of claim 8, wherein the programmable sideband processor module comprises:
an instruction tightly-coupled memory (ITCM) module;
a processor core; and
a data tightly-coupled memory (DTCM) module.

10. The data processing system of claim 9, wherein the DTCM module communicates with the multiport memory module and a direct memory access (DMA) module that controls data transfers between the DTCM module and the multiport memory module.

11. The data processing system of claim 9, wherein the DTCM module is at least one of dual-ported and multi-banked.

12. The data processing system of claim 8, wherein the programmable sideband processor module includes a single instruction, multiple data (SIMD) processor.

13. The data processing system of claim 8, wherein the programmable sideband processor module comprises:
an instruction multi-bank memory module;
a processor core; and
a data multi-bank memory module.

* * * * *